(12) United States Patent
Shen et al.

(10) Patent No.: US 9,436,729 B2
(45) Date of Patent: Sep. 6, 2016

(54) INFORMATION RETRIEVAL SYSTEM EVALUATION METHOD, DEVICE AND STORAGE MEDIUM

(71) Applicant: Tencent Technology (Shenzhen) Company Limited, Guangdong (CN)

(72) Inventors: Yan Shen, Guangdong (CN); Ruxuan Xue, Guangdong (CN); Zhengping Zhu, Guangdong (CN)

(73) Assignee: Tencent Technology (Shenzhen) Company Limited, Guangdong (CN)

( * ) Notice: Subject to any disclaimer, the term of this patent is extended or adjusted under 35 U.S.C. 154(b) by 136 days.

(21) Appl. No.: 14/328,809

(22) Filed: Jul. 11, 2014

(65) Prior Publication Data
US 2014/0324842 A1 Oct. 30, 2014

Related U.S. Application Data

(63) Continuation of application No. PCT/CN2013/090906, filed on Dec. 30, 2013.

(30) Foreign Application Priority Data

Mar. 15, 2013 (CN) .......................... 2013 1 0084139

(51) Int. Cl.
*G06F 17/00* (2006.01)
*G06F 17/30* (2006.01)
*H04L 29/08* (2006.01)

(52) U.S. Cl.
CPC ......... *G06F 17/30424* (2013.01); *H04L 67/22* (2013.01)

(58) Field of Classification Search
CPC .................. G06F 17/30864; G06F 17/30241; G06F 17/2217; G06F 17/27; G06F 17/276
See application file for complete search history.

(56) References Cited

U.S. PATENT DOCUMENTS 1,940,937 A * 12/1933 Burt .......................... G11B 7/00
369/112.24

FOREIGN PATENT DOCUMENTS

CN          1940937        4/2007
EP          1006458        6/2000

OTHER PUBLICATIONS

International Search Report, PCT/CN2013/090906, Tencent Technology (Shenzhen) Company Limited, Mar. 20, 2014.
Patent Abstract of CN1940937, Retrieval System, Information Processing System and Program Product, Brother Ind. Ltd., Apr. 4, 2007.

* cited by examiner

*Primary Examiner* — Truong Vo
(74) *Attorney, Agent, or Firm* — McDonald Hopkins LLC

(57) ABSTRACT

The present disclosure discloses an information retrieval system evaluation method, device and storage medium. A ratio between the sum of all the related object parameters of a keyword in keyword in an evaluation retrieval result set and the sum of all the related object parameters of the keyword in keyword in a retrieval result set is used to compute a recall rate of an information retrieval system. And the recall rate is introduced to evaluate the information retrieval system, thereby enhancing accuracy of quantitative evaluation of the information retrieval system, and improving the automation degree of evaluation.

11 Claims, 3 Drawing Sheets

INFORMATION RETRIEVAL SYSTEM EVALUATION METHOD, DEVICE AND STORAGE MEDIUM

This application claims priority to and is a continuation application of PCT/CN2013/090906, filed on Dec. 30, 2013 and entitled "INFORMATION RETRIEVAL SYSTEM EVALUATION METHOD, DEVICE AND STORAGE MEDIUM", which claims priority to Chinese Patent Application No. 201310084139.4, filed with the Chinese Patent Office on Mar. 15, 2013 by Tencent technology (Shenzhen) Co., Ltd. and entitled "INFORMATION RETRIEVAL SYSTEM EVALUATION METHOD AND DEVICE", which are incorporated herein reference in their entirety.

TECHNICAL FIELD

The present disclosure relates to the field of communications technologies, and in particular, to an information retrieval system evaluation method, device and storage medium.

BACKGROUND

This section provides background information related to the present disclosure which is not necessarily prior art.

An information retrieval system forms a core technology of an existing Internet application, and the information retrieval system may be used to retrieve a web page, a music file, a video file and an image file in the whole Internet, and may also be used to retrieve information and a subject in a single website or database, and the quality of a retrieval result thereof has great influence to the usage experience of an Internet application. An evaluation method of an existing information retrieval system often relies on manual evaluation, and requires personnel to participate much work.

And, the evaluation mainly focuses on information retrieval such as addressing retrieval. For an information retrieval system of another type, the evaluation is weak in applicability, bad in accuracy, and cannot reflect the retrieval performance of the information retrieval system.

SUMMARY

Therefore, it is an object of the embodiments of the present disclosure to provide an information retrieval system evaluation method, device and storage medium to solve one or more problems set forth above and other problems.

The embodiments of the present disclosure provide an information retrieval system evaluation method, which includes:

obtaining behavior data sample reported by an information retrieval system within a pre-determined period;

obtaining a sample retrieval keyword set and a sample retrieval result corresponding to each sample retrieval keyword according to the behavior data sample;

invoking the information retrieval system to perform evaluation retrieval on a pre-determined evaluation keyword set, computing a recall rate and a correctness percentage corresponding to each keyword in the evaluation keyword set according to an evaluation retrieval result and the sample retrieval result; and computing an evaluation indicator of the information retrieval system according to the recall rate and the correctness percentage, where the recall rate is a ratio between the sum of all related object parameters in the evaluation retrieval result corresponding to a keyword and the sum of all the related object parameters in the sample retrieval result corresponding to the keyword;

the correctness percentage is computed according to the number of the related objects and the number of the non-related objects in the evaluation retrieval result corresponding to the keyword; and the related object corresponding to the keyword is an object where a user performs operation in the sample retrieval result corresponding to the keyword; the non-related object corresponding to the keyword is an object where a user does not performs operation in the sample retrieval result corresponding to the keyword.

The embodiments of the present disclosure further disclose an information retrieval system evaluation device, comprising: one or more processors, memory and one or more program units stored in the memory and to be executed by the one or more processors, the one or more program units comprising: a behavior data collecting unit, an analyzing unit, an evaluation retrieval unit and an evaluation indicator computing unit; wherein the behavior data collecting unit is configured to obtain behavior data sample reported by an information retrieval system within a pre-determined period;

the analyzing unit is configured to obtain a sample retrieval keyword set and a sample retrieval result corresponding to each sample retrieval keyword according to the behavior data sample;

the evaluation retrieval unit is configured to invoke the information retrieval system to perform evaluation retrieval on a pre-determined evaluation keyword set, compute a recall rate and a correctness percentage corresponding to each keyword in the evaluation keyword set according to an evaluation retrieval result and the sample retrieval result; and the evaluation indicator computing unit is configured to compute an evaluation indicator of the information retrieval system according to the recall rate and the correctness percentage, where the recall rate is a ratio between the sum of all related object parameters in the evaluation retrieval result corresponding to a keyword and the sum of all the related object parameters in the sample retrieval result corresponding to the keyword;

the correctness percentage is computed according to the number of the related objects in the evaluation retrieval result corresponding to the keyword and the number of the non-related objects in the retrieval result sub-set; and the related object corresponding to the keyword is an object where a user performs operation in the sample retrieval result corresponding to the keyword; the non-related object corresponding to the keyword is an object where a user does not performs operation in the sample retrieval result corresponding to the keyword.

The embodiments of the present disclosure further disclose a storage medium containing a computer executable instruction, the computer executable instruction is used to perform an information retrieval system evaluation method when executed by a compute processor, where the method includes the following steps:

obtaining behavior data sample reported by an information retrieval system within a pre-determined period;

obtaining a sample retrieval keyword set and a sample retrieval result corresponding to each sample retrieval keyword according to the behavior data sample;

invoking an information retrieval system to perform evaluation retrieval on a pre-determined evaluation keyword set, computing a recall rate and a correctness percentage corresponding to each keyword in the evaluation keyword set according to an evaluation retrieval result and the sample retrieval result; and computing an evaluation indicator of the information retrieval system according to the recall rate and the correctness percentage, where the recall rate is a ratio between the sum of all the related object parameters in an evaluation retrieval result corresponding to a keyword and the sum of all the related object parameters in a sample retrieval result corresponding to the keyword;

the correctness percentage is computed according to the number of the related objects and the number of the non-related objects in the evaluation retrieval result corresponding to the keyword; and the related object corresponding to the keyword is an object where a user performs operation in the sample retrieval result corresponding to the keyword; the non-related object corresponding to the keyword is an object where a user does not performs operation in the sample retrieval result corresponding to the keyword.

DESCRIPTION OF EMBODIMENTS

Technical solutions in the present disclosure are described in detail with reference to the accompanying drawings and the embodiments.

Figure 1:
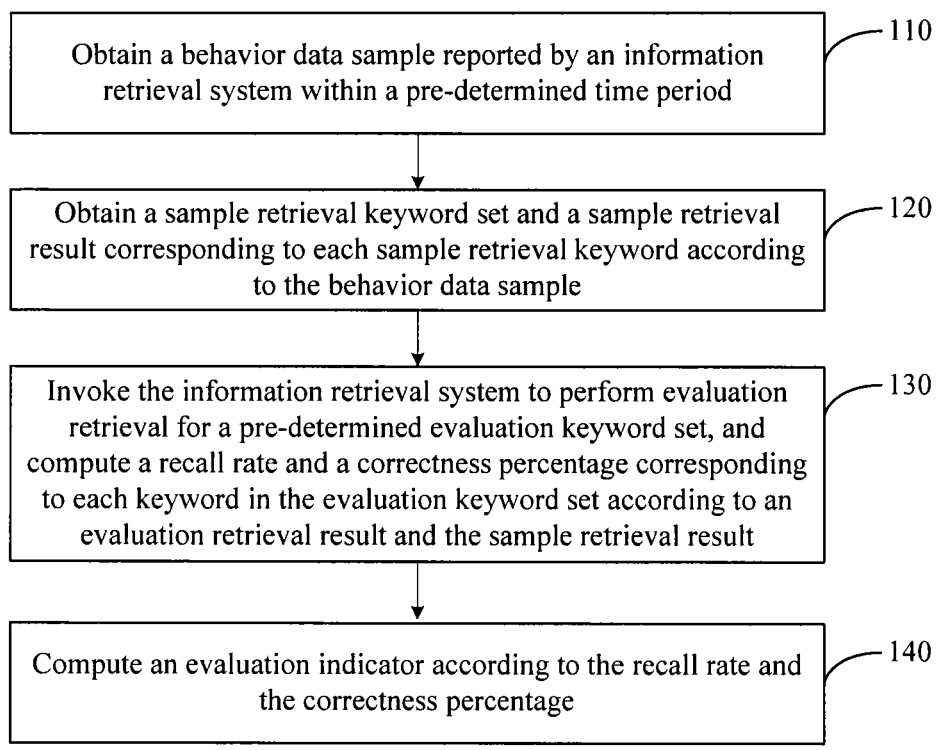
FIG. 1 is a schematic flow chart of an information retrieval system evaluation method in a first embodiment of the present disclosure.
Figure 3:
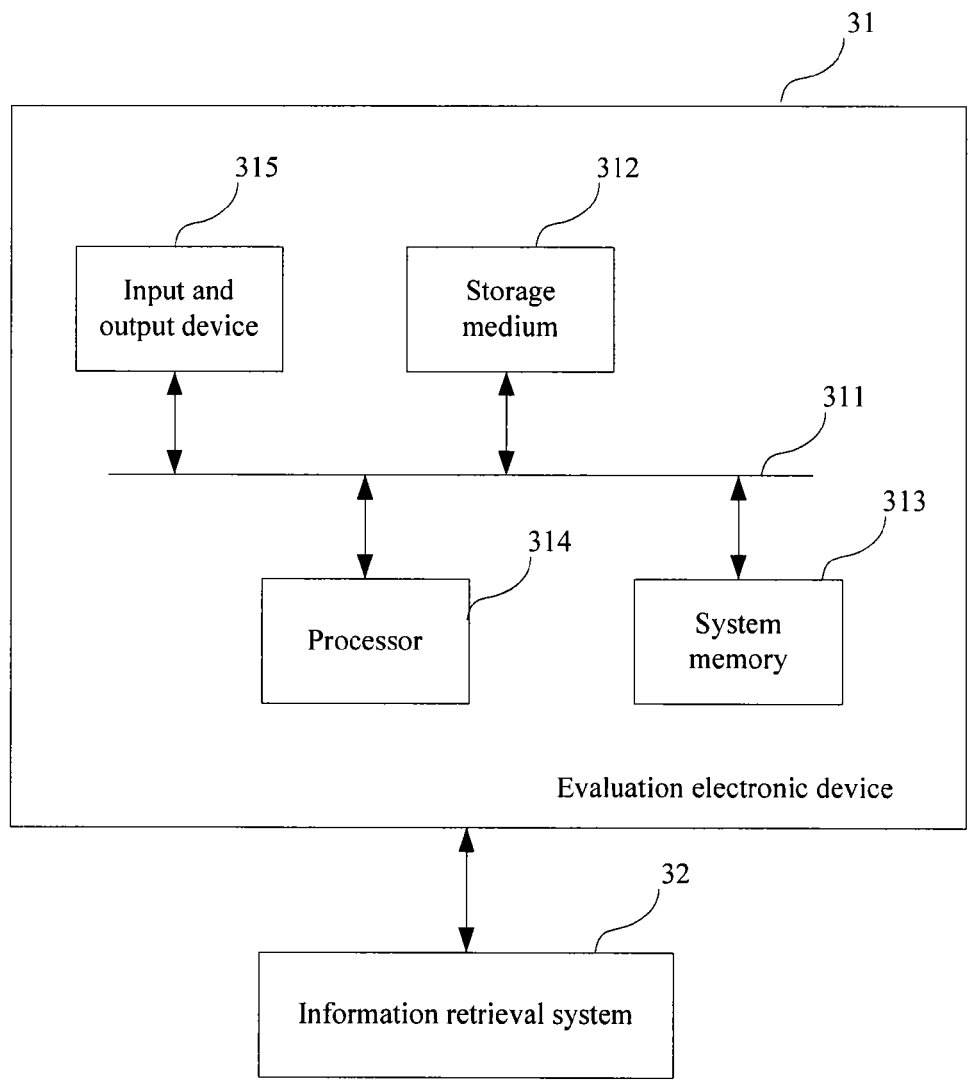
FIG. 3 is a schematic diagram of an implementation environment of an information retrieval system evaluation method in embodiments of the present disclosure.

FIG. 1 is a schematic flow chart of an information retrieval system evaluation method in a first embodiment of the present disclosure. The method in the present disclosure may implement information retrieval system evaluation through an evaluation electronic device communicated with the information retrieval system. As shown in FIG. 3, the evaluation electronic device 31 may include various storage medium 312, a system memory 313, a processor 314 and an input and output device 315 connected through a system bus 311. The storage medium 312 may be magnetic disk, an optical disk, a read-only memory (Read-Only Memory, ROM, a random access memory (Random Access Memory, RAM), or any other medium having a storage function.

The evaluation electronic device 31 is in communication connection with the information retrieval system 32, the communication may be a local area network (LAN) and a wide area network (WAN), and may further be another network. Networking of this kind is based on a computer network, Intranet, Internet within an office of an enterprise. The evaluation electronic device 31 may access the information retrieval system 32 through communication connection, and obtain required data.

As shown in FIG. 1, the method includes the following.

Step 110: The evaluation electronic device 31 obtains behavior data sample reported by the information retrieval system 32 within a pre-determined period.

Specifically, the evaluation electronic device 31 obtains related parameters of a user using the information retrieval system 32 and reported by an interaction module, a searching module and any another module (such as a downloading module or another running module) related to subsequent operations in the information retrieval system 32 within a pre-determined period (for example, one month preferably or a longer period), including a keyword used for retrieval within a certain pre-determined period, an retrieval result, an arrangement position of each object in the retrieval result listed in the retrieval result, and an operation such as whether a user clicks the retrieval result.

In the embodiments of the present disclosure, the retrieval result refers to a retrieved object list obtained through the information retrieval system 32, and the object refers to specific retrieval target of the information retrieval system 32, and may be a web page, a document, a subject, an image, or files of other type.

Step 120: The evaluation electronic device 31 obtains a sample retrieval keyword set and a sample retrieval result corresponding to each sample retrieval keyword according to the behavior data sample.

In this step, the evaluation electronic device 31 analyzes and acquires a sample retrieval keyword set and a retrieval result corresponding to each sample retrieval keyword according to the behavior data sample, that is, a sample retrieval result, and the evaluation electronic device 31 determines a related object and a non-related object of each sample retrieval keyword at the same time. In the embodiment of the present disclosure, the sample retrieval result corresponding to each sample retrieval keyword may be formed by a sample retrieval sub-result, where each sample retrieval sub-result specifically is a result obtained through retrieving the keyword at different time within a pre-determined period.

If in a retrieval result of retrieving a specified keyword contained in the obtained behavior data sample, the user performs a further operation (such as click) on a specified object in the retrieval result, the object is the related object in the specified keyword, that is, the related object of the keyword is an object where the user performs an operation in the sample retrieval result of the keyword. Correspondingly, if in all the retrieval results to the specified keyword, the user does not perform any operation on the specified object of all retrieval results, the object is a non-related object of the specified keyword, that is, the non-related object of the keyword is an object where the user does not perform a further operation in the sample retrieval result of the keyword.

At the same time, in a preferred implementation manner of this embodiment, the related object parameters of all related objects corresponding to the keyword may further be determined according to the sample retrieval result of the keyword in this step, and is used to represent dependency between the related object and the corresponding keyword.

In another preferred implementation manner of this embodiment, if the user may perform two different further operations on the object in the retrieval result, the related object parameter of each related object may be computed according to the following formula:

$$\text{score} = \frac{a}{ExposeCnt} \sum_{x=1}^{FCnt} FirstScore_x + \frac{b}{ExposeCnt} \sum_{y=1}^{SCnt} SecondScore_y + \sigma$$

ExposeCnt is the total number of times that the related object appears in a sample retrieval result of a corresponding keyword, FCnt is the total number of times that a user performs first operation on the related object appearing in a sample retrieval result of a corresponding keyword, SCnt is the total number of times that a user performs second operation on the related object appearing in a sample retrieval result of a corresponding keyword, a is a first operation weight coefficient, b is a second operation weight coefficient, and σ is an offset coefficient. The evaluation electronic device 31 may adjust an influence from different operations to the dependency through the first operation weight coefficient and the second operation weight coefficient. At the same time, the evaluation electronic device 31 may adjust the related object parameter value through setting the offset coefficient according to the actual condition of the information retrieval system 32.

FirstScorex is a dependency coefficient when the related object appears in the sample retrieval result of the corresponding keyword for an xth time and is performed with the first operation, wherein the dependency coefficient is computed according to an order of the related object in a sample retrieval sub-result obtained in the retrieval; SecondScorey is a dependency coefficient when the related object appears in the sample retrieval result of the corresponding keyword for a yth time and is performed with the second operation, wherein the dependency coefficient is computed according to an order of the related object in a sample retrieval sub-result obtained in the retrieval. The closer is the rank of the related object in sample retrieval sub-result at the retrieval to the end, the higher the dependency coefficient is, because it indicates that the object is a true object of interest to the user since it receives further operation from the user despite of its bad rank. Besides, FirstScorex and SecondScorey are relevant to the rank condition of each object in the sample retrieval sub-result obtained after each retrieval, and therefore, FirstScorex and SecondScorey change with the change of the sample retrieval sub-result obtained after retrieval. It can be obtained from the foregoing formula that, the greater the number of times that the first operation and/or the second operation is performed on the related object of the keyword, the greater the dependency between the related object and the keyword is, so it is with the related object parameter.

In the present implementation manner, the first operation and the second operation may be different operations. For example, when the retrieved object is a document or a web page, the first operation is clicking for viewing, and the second operation is downloading; when the retrieved object is a music file, the first operation is clicking a listening link, and the second operation is downloading; when the retrieved object is an object, the first operation may be clicking a viewing link, and the second operation is clicking an ordering link or performing an ordering operation.

In the present implementation manner, when a dependency between a related object and a corresponding keyword is computed, considering the contribution of several different subsequent operations to the dependency, the evaluation electronic device 31 performs multi-latitude modeling, which better complies with the demand of an existing information retrieval system, and particularly complies with the demand of an information retrieval system of a non-addressing retrieval type.

Step 130: The evaluation electronic device 31 invokes the information retrieval system 32 to perform evaluation retrieval on a pre-determined evaluation keyword set, computes a recall rate and a correctness percentage corresponding to each keyword in the evaluation keyword set according to an evaluation retrieval result and the sample retrieval result.

The evaluation electronic device 31 may perform evaluation after receiving the behavior data sample and obtaining the sample retrieval result of each sample keyword in a sample keyword set by analyzing the sample. In this embodiment, the evaluation electronic device 31 may firstly perform evaluation retrieval on the pre-determined evaluation keyword set through automatically invoking the information retrieval system 32, so as to obtain a group of evaluation retrieval results corresponding to each evaluation keyword in the evaluation keyword set. The evaluation keyword set is a subset obtained according to a sample keyword set. And then a recall rate and a correctness percentage corresponding to each evaluation keyword are computed according to the evaluation retrieval result and the previously obtained sample retrieval result.

The recall rate is a ratio between the sum of all the related object parameters in the evaluation retrieval result corresponding to a keyword and the sum of all the related object parameters in the sample retrieval result corresponding to the keyword. The ratio represents the recall rate of the evaluation retrieval result relative to the sample retrieval result.

In a preferable implementation manner of this embodiment, after the recall rate of each keyword is computed, an arithmetic mean value of the recall rates of all keywords is also computed. Specifically, the arithmetic mean value of the recall rates of all keywords may be computed according to the following formula:

$$R = \frac{1}{n}\sum_{k=1}^{n} R_k, \ R_k = \frac{HitScore_k}{TotalScore_k}$$

Where, n is the number of keywords in the evaluation keyword set, $R_k$ is a recall rate of a Kth evaluation keyword, $HitScore_k$ is the sum of all the related object parameters in an evaluation retrieval result corresponding to a Kth evaluation keyword, and $TotalScore_k$ is the sum of all the related object parameters in a sample retrieval result corresponding to a Kth evaluation keyword. The related object parameter is computed in step 120 and is used to represent the dependency between the related object and the corresponding keyword.

In this embodiment, the related object parameter is introduced to represent the dependency between each related object and the keyword, which gives different weights to each related object, so that different related objects exert different impacts on a recall rate, which better complies with the performance demand of the information retrieval system 32, thereby improving the accuracy of the recall rate computing.

The correctness percentage may be computed according to the number of the related objects and the number of the non-related objects in the evaluation retrieval result, which is a parameter reflecting the accuracy and precision of the evaluation retrieval.

In a preferable implementation manner of this embodiment, after the correctness percentage of each keyword is computed, an arithmetic mean value of the correctness percentages of all keywords is computed. Specifically, the arithmetic mean value of the correctness percentages is computed according to the following formula:

$$P = \frac{1}{n}\sum_{k=1}^{n} P_k, \quad P_k = \frac{1}{H_k}\sum_{r=1}^{H_k} \frac{H_k - I_{k,r}}{H_k}$$

Where, n is the number of keywords in the evaluation keyword set, Pk is the correctness percentage of a Kth evaluation keyword, Hk is the number of the related objects included in the evaluation retrieval result of the Kth evaluation keyword, and Ik,r is the number of the non-related objects whose arrangement position is in front of the arrangement position of an rth related object in the evaluation retrieval result of the Kth evaluation keyword.

In the foregoing implementation manner, the correctness percentage of the evaluation retrieval is computed by adding up the correctness percentage of each keyword and obtaining a mean value so that the distribution condition of a related result is also considered when the amount is considered, thereby improving the computing precision of the correctness percentage.

Step 140: The evaluation electronic device 31 computes the evaluation indicator of the information retrieval system 32 according to the recall rate and the correctness percentage.

In this step, the evaluation indicator is computed according to the computed recall rate and correctness percentage. In a preferable implementation manner of this embodiment, the evaluation indicator is computed by using an arithmetic mean value R of the recall rates and an arithmetic mean value P of the correctness percentages. Specifically, the evaluation indicator F is computed according to the following formula:

$$F = \frac{(\beta^2 + 1)PR}{\beta^2 P + R}$$

Where, F is the evaluation indicator, R is an arithmetic mean value of recall rates corresponding to all evaluation keywords, P is an arithmetic mean value of correctness percentages corresponding to all evaluation keywords, and β is a pre-determined weight coefficient. The weight coefficient β is used to adjust an influence weight of the recall rate and the correctness percentage on the evaluation indicator, where β<1 indicates emphasizing the accuracy, β>1 indicates emphasizing the recall rate, and β=1 indicates that the weight of the accuracy and the weight of the recall rate are equal.

Definitely, a person skilled in the art may understand that, the evaluation indicator may also be computed through manners such as computing a weighted mean value of the recall rate and the correctness percentage of each keyword.

In the present disclosure, a ratio between the sum of all the related object parameters of a keyword in keyword in an evaluation retrieval result set and the sum of all the related object parameters of the keyword in keyword in a retrieval result set is used to compute a recall rate of an information retrieval system. And the recall rate is introduced to evaluation the information retrieval system, thereby enhancing accuracy of quantitative evaluation of the information retrieval system, and improving the automation degree of evaluation.

Figure 2:
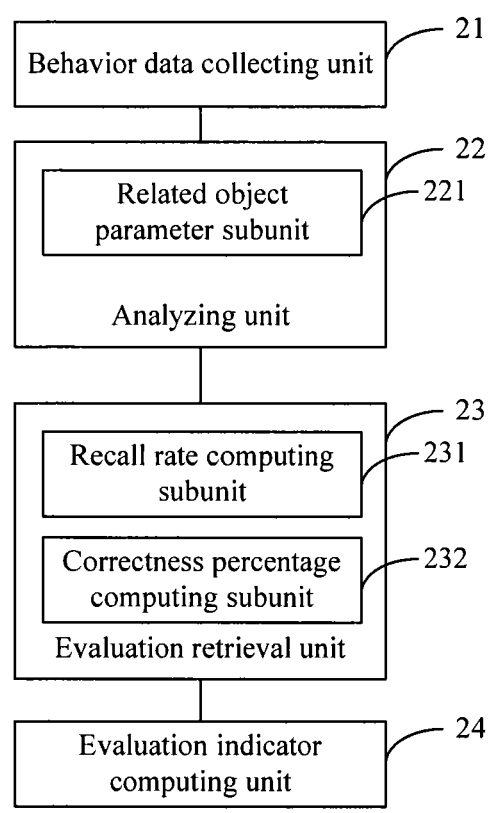
FIG. 2 is a schematic structural diagram of an information retrieval system evaluation device in a second embodiment of the present disclosure.

In the embodiments of the present disclosure, an information retrieval system evaluation device, comprising: one or more processors, memory and one or more program units stored in the memory and to be executed by the one or more processors. FIG. 2 is a schematic structural diagram of one or more program units of an information retrieval system evaluation device in a second embodiment of the present disclosure. As shown in FIG. 2, the one or more program units include a behavior data collecting unit 21, an analyzing unit 22, an evaluation retrieval unit 23 and an evaluation indicator computing unit 24.

The behavior data collecting unit 21 is configured to obtain behavior data sample reported by an information retrieval system within a pre-determined period.

Specifically, a related parameter of a user using the information retrieval system and reported by an interaction module, a searching module and any another module related to subsequent operations of the information retrieval system within a pre-determined period (for example, one month preferably or a longer period) includes a keyword used for retrieval within a certain pre-determined period, an retrieval result, an arrangement position of each object in the retrieval result listed in the retrieval result, and an operation such as whether a user clicks the retrieval result.

In the present disclosure, the retrieval result refers to a retrieved object list obtained through the information retrieval system, and the object refers to specific retrieval target of the information retrieval system, and may be a web page, a document, a subject, an image, or files of other type.

The analyzing unit 22 is configured to obtain a sample retrieval keyword set and a sample retrieval result corresponding to each sample retrieval keyword according to the behavior data sample.

The evaluation retrieval unit 23 is configured to invoke the information retrieval system to perform evaluation retrieval on a pre-determined evaluation keyword set, compute a recall rate and a correctness percentage corresponding to each keyword in the evaluation keyword set according to an evaluation retrieval result and the sample retrieval result.

The evaluation indicator computing unit 24 is configured to compute an evaluation indicator of the information retrieval system according to the recall rate and the correctness percentage.

In a preferred implementation manner of this embodiment, the evaluation indicator computing unit 24 computes the evaluation indicator according to the following formula.

$$F = \frac{(\beta^2 + 1)PR}{\beta^2 P + R}$$

Where, F is the evaluation indicator, R is an arithmetic mean value of recall rates corresponding to all evaluation keywords, P is an arithmetic mean value of correctness percentages corresponding to all evaluation keywords, and β is a pre-determined weight coefficient. The weight coefficient β is used to adjust an influence weight from the recall rate and the correctness percentage to the evaluation indicator, where β<1 indicates emphasizing the accuracy, β>1 represents emphasizing the recall rate, and β=1 indicates that the weight of the accuracy and the weight of the recall rate are equal.

Definitely, a person skilled in the art may understand that, the evaluation indicator may also be computed through manners such as computing a weighted mean value of the recall rate and the correctness percentage of each keyword.

In a preferred implementation manner of this embodiment, the evaluation retrieval unit 23 includes a recall rate computing subunit 231.

The recall rate computing subunit 231 is configured to compute an arithmetic mean value of the recall rates according to the following formula:

$$R = \frac{1}{n}\sum_{k=1}^{n} R_k, \quad R_k = \frac{HitScore_k}{TotalScore_k}$$

Where, n is the number of keywords in the evaluation keyword set, $R_k$ is a recall rate of a Kth evaluation keyword, $HitScore_k$ is the sum of all the related object parameters in an evaluation retrieval result corresponding to a Kth evaluation keyword, and $TotalScore_k$ is the sum of all the related object parameters in a sample retrieval result corresponding to a Kth evaluation keyword, wherein a related object parameter corresponding to the Kth evaluation keyword is computed according to the number of times that a user performs operation on a related object corresponding to the Kth evaluation keyword and an arrangement position of a related object corresponding to the Kth evaluation keyword in its each corresponding sample retrieval sub-result. The related object parameter is used to represent the dependency degree between the related object and the keyword The related object parameter is computed by the analyzing unit 22, specifically, is computed by the related object parameter subunit 221 of the analyzing unit 22.

The related object parameter subunit 221 is configured to compute a corresponding related object parameter score according to the following formula:

$$score = \frac{a}{ExposeCnt}\sum_{x=1}^{FCnt} FirstScore_x + \frac{b}{ExposeCnt}\sum_{y=1}^{SCnt} SecondScore_y + \sigma$$

Where, ExposeCnt is the total number of times that the related object appeas in a sample retrieval result of a corresponding keyword, FCnt is the total number of times that a user performs first operation on the related object appearing in a sample retrieval result of a corresponding keyword, SCnt is the total number of times that a user performs second operation on the related object appearing in a sample retrieval result of a corresponding keyword, a is a first operation weight coefficient, b is a second operation weight coefficient, σ is an offset coefficient; $FirstScore_x$ is a dependency coefficient when the related object appears in the sample retrieval result of the corresponding keyword for an xth time and being performed with the first operation, and is computed according to the arrangement position of the related object in the sample retrieval sub-result at the retrieval; $SecondScore_y$ is a dependency coefficient that the related object appears in sample retrieval result of a corresponding keyword for a yth time and being performed with the second operation, and is computed according to the arrangement position of the related object of sample retrieval sub-result at the retrieval.

In this implementation manner, the first operation and the second operation may be different operations. For example, when the retrieved object is a document or a web page, the first operation is click and check, the second operation is downloading; when the retrieved object is a music file, the first operation is clicking a listening link, and the second operation is downloading; when the retrieved object is a subject, the first operation may be a check link, and the second operation is clicking an order link or performing ordering operation.

In this embodiment, when dependency between the related object and a corresponding keyword is computed, considering the contribution of several different subsequent operations to the dependency, several latitude modeling is performed, which complies with the demand of an information retrieval system of a non-addressing retrieval type.

In a preferred implementation manner of this embodiment, the evaluation retrieval unit 23 further includes a correctness percentage computing subunit 232.

The correctness percentage computing subunit 232 is configured to compute the arithmetic mean value of the correctness percentages of the keyword according to the following formula:

$$P = \frac{1}{n}\sum_{k=1}^{n} P_k, \quad P_k = \frac{1}{H_k}\sum_{r=1}^{H_k} \frac{H_k - I_{k,r}}{H_k}$$

Where, n is the number of keywords in the evaluation keyword set, Pk is the correctness percentage of a Kth evaluation keyword, Hk is the number of the related objects included in the evaluation retrieval result of the Kth evaluation keyword, Ik,r is The number of the non-related objects whose arrangement position is in front of the arrangement position of an rth related object in the evaluation retrieval result of the Kth evaluation keyword.

In this implementation manner, the correctness percentage of the evaluation retrieval is computed through adding the correctness percentage of each keyword for mean value seeking so that the distribution condition of a relevant result is also considered when the amount is considered, thereby improving the computation precision of the correctness percentage to a certain degree.

Obviously, a person skilled in the art should be understood that, each module or each step of the embodiments of the present disclosure may be implemented through a universal computation device, which may be integrated in a single computation, or distributed in a network system formed by multiple computation devices. Optionally, they can be implemented by using an executable code of a computer program, so that they can be stored in the storage device to be performed by the computing device, or they may be made into each integrated circuit module respectively, or they may be implemented by making multiple modules or steps among them into a single integrated circuit module. In this way, the present disclosure is not limited to any specified combination of hardware and software.

In addition, an embodiment of the present disclosure further discloses a storage medium containing a computer executable instruction, the computer executable instruction is used to perform an information retrieval system evaluation method when executed by a compute processor, where the method includes the following steps:

obtaining behavior data sample reported by an information retrieval system within a pre-determined period;

obtaining a sample retrieval keyword set and a sample retrieval result corresponding to each sample retrieval keyword according to the behavior data sample;

invoking the information retrieval system to perform evaluation retrieval on a pre-determined evaluation keyword set, computing a recall rate and a correctness percentage corresponding to each keyword in the evaluation keyword set according to an evaluation retrieval result and the sample retrieval result; and computing an evaluation indicator of the information retrieval system according to the recall rate and the correctness percentage, wherein the recall rate is a ratio between the sum of all related object parameters in the evaluation retrieval result corresponding to a keyword and the sum of all the related object parameters in the sample retrieval result corresponding to the keyword;

the correctness percentage is computed according to the number of the related objects and the number of the non-related objects in the evaluation retrieval result corresponding to the keyword; and the related object corresponding to the keyword is an object where a user performs operation in the sample retrieval result corresponding to the keyword; the non-related object corresponding to the keyword is an object where a user does not performs operation in the sample retrieval result corresponding to the keyword.

The foregoing descriptions are merely preferable embodiments of the present disclosure, but are not intended to limit the protection scope of the present disclosure. For a person skilled in the art, the present disclosure may be amended and changed. Any equivalent modification or replacement readily within the spirit and the principle of the present disclosure shall fall within the protection scope of the present disclosure.

What is claimed is:

1. An information retrieval system evaluation method, comprising:

Obtaining, by an evaluation electronic device, behavior data sample reported by an information retrieval system within a pre-determined period;

obtaining, by an evaluation electronic device, a sample retrieval keyword set and a sample retrieval result corresponding to each sample retrieval keyword according to the behavior data sample;

invoking, by an evaluation electronic device, the information retrieval system to perform evaluation retrieval on a pre-determined evaluation keyword set, computing a recall rate and a correctness percentage corresponding to each keyword in the evaluation keyword set according to an evaluation retrieval result and the sample retrieval result; and computing, by an evaluation electronic device, an evaluation indicator of the information retrieval system according to the recall rate and the correctness percentage, where the recall rate is a ratio between the sum of all related object parameters in the evaluation retrieval result corresponding to a keyword and the sum of all the related object parameters in the sample retrieval result corresponding to the keyword;

the correctness percentage is computed according to the number of the related objects and the number of the non-related objects in the evaluation retrieval result corresponding to the keyword; and the related object corresponding to the keyword is an object where a user performs operation in the sample retrieval result corresponding to the keyword; the non-related object corresponding to the keyword is an object where a user does not perform operation in the sample retrieval result corresponding to the keyword.

2. The information retrieval system evaluation method according to claim 1, wherein the evaluation indicator of the information retrieval system is computed according to the following formula, by an evaluation electronic device:

$$F = \frac{(\beta^2 + 1)PR}{\beta^2 P + R}$$

wherein, F is the evaluation indicator, R is an arithmetic mean value of recall rates corresponding to all evaluation keywords, P is an arithmetic mean value of correctness percentages corresponding to all evaluation keywords, and $\beta$ is a pre-determined weight coefficient.

3. The information retrieval system evaluation method according to claim 2, wherein the arithmetic mean value of the recall rates is computed according to the following formula, by an evaluation electronic device:

$$R = \frac{1}{n}\sum_{k=1}^{n} R_k, \; R_k = \frac{HitScore_k}{TotalScore_k}$$

wherein, n is the number of keywords in the evaluation keyword set, $R_k$ is a recall rate of a Kth evaluation keyword, $HitScore_k$ is the sum of all the related object parameters in an evaluation retrieval result corresponding to a Kth evaluation keyword, and $TotalScore_k$ is the sum of all the related object parameters in a sample retrieval result corresponding to a Kth evaluation keyword, wherein a related object parameter corresponding to the Kth evaluation keyword is computed according to the number of times that a user performs operation on a related object corresponding to the Kth evaluation keyword and an arrangement position of a related object corresponding to the Kth evaluation keyword in its each corresponding sample retrieval sub-result.

4. The information retrieval system evaluation method to claim 3, wherein the related object parameter score of each related object is computed according to the following formula, by an evaluation electronic device:

$$score = \frac{a}{ExposeCnt}\sum_{x=1}^{FCnt} FirstScore_x + \frac{b}{ExposeCnt}\sum_{y=1}^{SCnt} SecondScore_y + \sigma$$

wherein, ExposeCnt is the total number of times that the related object appears in a sample retrieval result of a corresponding keyword, FCnt is the total number of times that a user performs first operation on the related object appearing in a sample retrieval result of a corresponding keyword, SCnt is the total number of times that a user performs second operation on the related object appearing in a sample retrieval result of a corresponding keyword, a is a first operation weight coefficient, b is a second operation weight coefficient, $\sigma$ is an offset coefficient;

$FirstScore_x$ is a dependency coefficient when the related object appears in the sample retrieval result of the corresponding keyword for an xth time and being performed with the first operation, the dependency coefficient is computed according to arrangement position of the related object in a sample retrieval sub-result in the retrieval; and $SecondScore_y$ is a dependency coefficient when the related object appears in the sample retrieval result of the corresponding keyword for a yth time and being performed with the second operation, wherein the dependency coefficient is computed according to arrangement position of the related object in a sample retrieval sub-result in the retrieval.

5. The information retrieval system evaluation method according to claim 2, wherein the arithmetic mean value of the correctness percentages is computed according to the following formula, by an evaluation electronic device:

$$P = \frac{1}{n}\sum_{k=1}^{n} P_k, \quad P_k = \frac{1}{H_k}\sum_{r=1}^{H_k} \frac{H_k - I_{k,r}}{H_k}$$

wherein, n is the number of keywords in the evaluation keyword set, Pk is the correctness percentage of a Kth evaluation keyword, Hk is the number of the related objects included in the evaluation retrieval result of the Kth evaluation keyword, Ik,r is the number of the non-related objects whose arrangement position is in front of the arrangement position of an rth related object in the evaluation retrieval result of the Kth evaluation keyword.

6. An information retrieval system evaluation device, comprising: one or more processors, memory and one or more program units stored in the memory and to be executed by the one or more processors, the one or more program units comprising: a behavior data collecting unit, an analyzing unit, an evaluation retrieval unit and an evaluation indicator computing unit; wherein
the behavior data collecting unit is configured to obtain behavior data sample reported by an information retrieval system within a pre-determined period;
the analyzing unit is configured to obtain a sample retrieval keyword set and a sample retrieval result corresponding to each sample retrieval keyword according to the behavior data sample;
the evaluation retrieval unit is configured to invoke the information retrieval system to perform evaluation retrieval on a pre-determined evaluation keyword set, computing a recall rate and a correctness percentage corresponding to each keyword in the evaluation keyword set according to an evaluation retrieval result and the sample retrieval result; and
the evaluation indicator computing unit is configured to compute an evaluation indicator of the information retrieval system according to the recall rate and the correctness percentage, wherein
the recall rate is a ratio between the sum of all related object parameters in the evaluation retrieval result corresponding to a keyword and the sum of all the related object parameters in the sample retrieval result corresponding to the keyword;
the correctness percentage is computed according to the number of the related objects and the number of the non-related objects in the evaluation retrieval result corresponding to the keyword; and
the related object corresponding to the keyword is an object where a user performs operation in the sample retrieval result corresponding to the keyword; the non-related object corresponding to the keyword is an object where a user does not perform operation in the sample retrieval result corresponding to the keyword.

7. The information retrieval system evaluation device according to claim 6, wherein, the evaluation indicator computing unit is configured to compute the evaluation indicator of the information retrieval system according to the following formula:

$$F = \frac{(\beta^2 + 1)PR}{\beta^2 P + R}$$

wherein, F is the evaluation indicator, R is an arithmetic mean value of recall rates corresponding to all evaluation keywords, P is an arithmetic mean value of correctness percentages corresponding to all evaluation keywords, and β is a pre-determined weight coefficient.

8. The information retrieval system evaluation device according to claim 7, wherein the evaluation retrieval unit comprises a recall rate computing subunit; wherein
the recall rate computing subunit is configured to compute an arithmetic mean value of the recall rates according to the following formula:

$$R = \frac{1}{n}\sum_{k=1}^{n} R_k, \quad R_k = \frac{HitScore_k}{TotalScore_k}$$

wherein, n is the number of keywords in the evaluation keyword set, $R_k$ is a recall rate of a Kth evaluation keyword, $HitScore_k$ is the sum of all the related object parameters in an evaluation retrieval result corresponding to a Kth evaluation keyword, and $TotalScore_k$ is the sum of all the related object parameters in a sample retrieval result corresponding to a Kth evaluation keyword, wherein a related object parameter corresponding to the Kth evaluation keyword is computed according to the number of times that a user performs operation on a related object corresponding to the Kth evaluation keyword and an arrangement position of a related object corresponding to the Kth evaluation keyword in its each corresponding sample retrieval sub-result.

9. The information retrieval system evaluation device according to claim 8, wherein the analyzing unit comprises a related object parameter computing subunit; wherein
the related object parameter subunit is configured to compute a corresponding related object parameter score according to the following formula:

$$score = \frac{a}{ExposeCnt}\sum_{x=1}^{FCnt} FirstScore_x + \frac{b}{ExposeCnt}\sum_{y=1}^{SCnt} SecondScore_y + \sigma$$

wherein, ExposeCnt is the total number of times that the related object appears in a sample retrieval result of a corresponding keyword, FCnt is the total number of times that a user performs first operation on the related object appears in a sample retrieval result of a corresponding keyword, SCnt is the total number of times that a user performs second operation on the related object appearing in a sample retrieval result of a corresponding keyword, a is a first operation weight coefficient, b is a second operation weight coefficient, σ is an offset coefficient; $FirstScore_x$ is a dependency coefficient when the related object appearing in the sample retrieval result of the corresponding keyword for an xth time and being performed with the first operation, the dependency coefficient is computed according to arrangement position of the related object in a sample retrieval sub-result in the retrieval; and $SecondScore_y$ is a dependency coefficient when the related object appears in the sample retrieval result of the corresponding keyword for a yth time and being performed with the second operation, wherein the dependency coefficient is computed according to arrangement position of the related object in a sample retrieval sub-result in the retrieval.

10. The information retrieval system evaluation device according to claim 7, wherein the evaluation retrieval unit comprises a correctness percentage computing subunit; wherein the correctness percentage computing subunit is configured to compute the arithmetic mean value of the correctness percentages according to the following formula:

$$P = \frac{1}{n}\sum_{k=1}^{n} P_k, \quad P_k = \frac{1}{H_k}\sum_{r=1}^{H_k} \frac{H_k - I_{k,r}}{H_k}$$

wherein, n is the number of keywords in the evaluation keyword set, $P_k$ is the correctness percentage of a Kth evaluation keyword, $H_k$ is the number of the related objects included in the evaluation retrieval result of the Kth evaluation keyword, and $I_{k,r}$ is the number of the non-related objects whose arrangement position is in front of the arrangement position of an rth related object in the evaluation retrieval result of the Kth evaluation keyword.

11. A non-transitory storage medium containing a computer executable instruction, wherein the computer executable instruction is used to perform an information retrieval system evaluation method when executed by a compute processor, and the method comprises the following steps:

obtaining behavior data sample reported by an information retrieval system within a pre-determined period;

obtaining a sample retrieval keyword set and a sample retrieval result corresponding to each sample retrieval keyword according to the behavior data sample;

invoking an information retrieval system to perform evaluation retrieval on a pre-determined evaluation keyword set, computing a recall rate and a correctness percentage corresponding to each keyword in the evaluation keyword set according to an evaluation retrieval result and the sample retrieval result; and computing an evaluation indicator of the information retrieval system according to the recall rate and the correctness percentage, wherein the recall rate is a ratio between the sum of all the related object parameters in an evaluation retrieval result corresponding to a keyword and the sum of all the related object parameters in a sample retrieval result corresponding to the keyword;

the correctness percentage is computed according to the number of the related objects and the number of the non-related objects in the evaluation retrieval result corresponding to the keyword; and the related object corresponding to the keyword is an object where a user performs operation in the sample retrieval result corresponding to the keyword; the non-related object corresponding to the keyword is an object where a user not performs operation in the sample retrieval result corresponding to the keyword.

* * * * *